US005997758A

United States Patent [19]

Barbarin et al.

[11] Patent Number: 5,997,758

[45] Date of Patent: Dec. 7, 1999

[54] FOAMING COMPOSITION AND USE THEREOF AS A FIRE-EXTINGUISHING FOAM

[75] Inventors: Michel Barbarin, Enchien-les-Bains; Alain Milius, Nice; Maryse Carrausse, Castres, all of France

[73] Assignee: Societe D'Exploitation de Produits Pour Les Industries Chimiques - SEPPIC, Paris Cedex, France

[21] Appl. No.: 08/973,143

[22] PCT Filed: May 31, 1996

[86] PCT No.: PCT/FR96/00818

§ 371 Date: Nov. 28, 1997

§ 102(e) Date: Nov. 28, 1997

[87] PCT Pub. No.: WO96/38204

PCT Pub. Date: Dec. 5, 1996

[30] Foreign Application Priority Data

Jun. 1, 1995 [FR] France .................................. 96 06505

[51] Int. Cl.[6] .............................. A62C 5/02; A62D 1/02; A62D 1/04; B01J 13/00

[52] U.S. Cl. ............................... 252/3; 252/8.05; 516/12; 516/14

[58] Field of Search ................................. 252/2, 3, 8.05; 516/12, 14

[56] References Cited

U.S. PATENT DOCUMENTS

| | | | |
|---|---|---|---|
| 4,099,574 | 7/1978 | Cooper et al. | 252/8.05 X |
| 4,859,349 | 8/1989 | Clark et al. | 252/8.05 X |
| 5,218,021 | 6/1993 | Clarrk et al. | 252/2 X |

FOREIGN PATENT DOCUMENTS

| | | |
|---|---|---|
| 0 096 426 | 12/1983 | European Pat. Off. . |
| 0 454 321 | 10/1991 | European Pat. Off. . |
| 0 621 057 | 10/1994 | European Pat. Off. . |
| WO 91/01160 | 2/1991 | WIPO . |

*Primary Examiner*—Richard D. Lovering
*Attorney, Agent, or Firm*—Young & Thompson

[57] ABSTRACT

A foaming composition containing one or more fluorinated surfactants and one or more alkylpolyglycoside hemisulphosuccinate surfactants of formula (I) is described, (I)

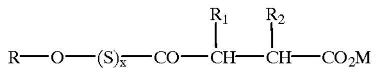

wherein R is a straight or branched chain alkyl radical with 6–18 carbon atoms, S is a sugar residue, one of $R_1$, and $R_2$ is a $SO_3M$ group, and the other a hydrogen atom, M is an alkali metal, preferably sodium, X is an integer of 1 to 10, preferably of 1 to 4. The foaming composition is useful as a fire-extinguishing foam.

21 Claims, No Drawings

FOAMING COMPOSITION AND USE THEREOF AS A FIRE-EXTINGUISHING FOAM

CROSS REFERENCE TO RELATED APPLICATION

This application is the 35 USC 371 national stage of international application PCT/FR96/00818 filed on May 31, 1996, which designated the United States of America.

FIELD OF THE INVENTION

The present invention relates to foaming compositions including fluorine-containing surfactants, these compositions being useful as fire-extinguishing emulsifiers.

BACKGROUND OF THE INVENTION

It is well known to employ foaming or emulsifier compositions based on surface-active agents for extinguishing fires of liquid solvents. These emulsifiers, known as fire-extinguishing emulsifiers, are generally thrown forward onto the fire in the form of a foam obtained by mixing them under pressure with water.

A particular class of fire-extinguishing emulsifiers is known under the designation of AFFF, for "Aqueous Film-Forming Foam" or "Agent Forming a Floating Film". AFFF compositions enable fires caused by liquid hydrocarbons to be rapidly extinguished. AFFF emulsifiers contain fluorine-containing surface-active agents which have a very low value of surface tension. As a result, these surfactants make it possible to produce a foam which, on separation, forms an aqueous film floating above the surface of the hydrocarbon. This aqueous film makes it possible to extinguish the fire and to prevent a possible reignition of the hydrocarbon.

However, emulsifiers of AFFF type, while being effective for extinguishing fires due to hydrocarbon liquids, are not effective in the case of fires caused by polar solvents, especially alcohols, ketones and esters of low molecular weights. In fact, with polar solvents of this type the foams obtained from AFFF emulsifiers are rapidly dissolved and destroyed.

A particular class of emulsifiers has been developed for fighting fires produced by such a polar solvent. These emulsifiers include fluorine-containing surfactants and a water-soluble polymer which precipitates in contact with the polar solvent, with the result that it forms a protective layer between said polar solvent and the foam. These emulsifiers are known under the designation A4P, for "Agent Producing a Multipurpose Protective Film" or under the designation ARAFFF, for "Alcohol Resistant Aqueous Film-Forming Foam". It is the designation ARAFFF that is employed in the present specification.

Emulsifiers of ARAFFF type are effective both on fires caused by hydrocarbon solvents and polar solvents.

In addition to the fluorine-containing surfactants, that is to say surfactants which have a perfluoroalkyl residue, emulsifiers of AFFF and ARAFFF type include surfactants not containing fluorine.

Thus, international applications WO 91/01160 and WO 92/15371 describe fire-extinguishing emulsifiers of AFFF and ARAFFF type containing nonionic surfactants of the alkylpolyglycoside type. The foremost advantage of these surfactants of alkylpolyglycoside type is that they allow a decrease in the concentration of the fluorine-containing surfactants in the emulsifiers of AFFF type. They also make it possible to reduce the content of water-soluble polymer in emulsifiers of ARAFFF type.

However, the Applicant Company has been able to ascertain that surfactants of alkylpolyglycoside type have the disadvantage of having to be used in combination with another, third, surfactant not containing fluorine with a view to obtaining a short emulsifier expansion time. The expansion time is the time needed for the emulsifier mixed with water to form the foam used for extinguishing fires.

It has also been ascertained that the foams formed from fire-extinguishing emulsifiers of AFFF and ARAFFF type including alkylpolyglycosides, even when the latter are used in combination with other surfactants, are relatively rapidly destroyed once the fire is extinguished. Risks of fire restarting are then possible.

SUMMARY OF THE INVENTION

The subject matter of the present invention is therefore new foaming compositions which are useful as fire-extinguishing emulsifiers avoiding the above-mentioned disadvantages. More particularly, the first subject matter of the invention is foaming compositions including, in addition to a fluorine-containing surfactant, another surfactant, not containing fluorine, which has no need to be used in combination with a third surfactant, not containing fluorine, with a view to obtaining a rapid expansion time.

According to another subject matter of the invention, the latter consists of a foaming composition which, while making it possible to obtain an excellent extinguishing power, also makes it possible to obtain a foam that is stable for a long period of time once the fire is extinguished.

The invention consequently relates to a foaming composition characterized in that it includes at least one fluorine-containing surfactant and at least one alkylpolyglycoside hemisulfosuccinate of formula I:

(I)

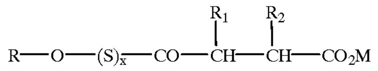

in which:

R denotes an alkyl radical with a linear or branched chain which has from 6 to 18 carbon atoms, S denotes a sugar residue, one of $R_1$ or of $R_2$ denotes a group $SO_3M$, the other being a hydrogen atom, M denotes an alkali metal, preferably sodium, x denotes an integer of between 1 and 10, preferably between 1 and 4.

The fluorine-containing surfactants used are those conventionally employed in foaming compositions of the fire-extinguishing emulsifier type. More particularly, these fluorine-containing surfactants are anionic, cationic, nonionic or, more preferably, amphoteric fluorine-containing surfactants.

The preferred amphoteric fluorine-containing surfactants consist of fluorine-containing betaines of formula (II):

(II)

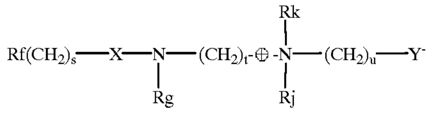

in which:

Rf is a linear or branched perfluoroalkyl radical containing from 4 to 18 carbon atoms, preferably from 6 to 16 carbon atoms, X denotes a CO or $SO_2$ group, preferably an $SO_2$ group, Rg denotes a hydrogen atom or a methyl or ethyl radical, each of Rk and Rj, which are identical or different, denotes a methyl or ethyl radical, $Y^-$ denotes an $S_3^-$, $OSO_3^-$ or $COO^-$ group, s is an integer ranging from 0 to 6, preferably equal to 0 or 2, t is an integer ranging from 1 to 5, preferably equal to 3, u is an integer ranging from 1 to 5, preferably equal to 1 or 2.

Other amphoteric perfluoroalkyl surfactants may be used within the scope of the present invention. Under this heading there may be mentioned fluorine-containing amine oxides of formula (IV):

(IV)

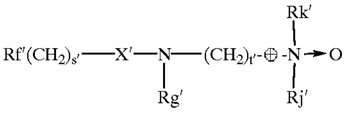

in which:

Rf' denotes a linear or branched perfluoroalkyl radical containing from 4 to 18 carbon atoms, preferably from 6 to 16 carbon atoms, X' denotes a CO or $SO_2$ group, preferably an $SO_2$ group, Rg' denotes a hydrogen atom or a methyl or ethyl radical, each of Rk' and Rj', which are identical or different, denotes a methyl or ethyl radical, s' is an integer ranging from 0 to 6, preferably equal to 0 or 2, t' is an integer ranging from 1 to 5, preferably equal to 3.

Mixtures of fluorine-containing surfactants of formulae (II) and (IV) above can also be used.

The weight content of fluorine-containing surfactant in the foaming composition according to the invention may be between 1 and 8%.

Alkylpolyglycoside hemisulfosuccinates are surfactants which are well known not to present any environmental problem, to be safe for the human body, weakly irritant and easily biodegradable. They, and the process for their preparation, are described, for example, in European Patent Application EP-A-0,454,321. They are also described in the PCT International Application FR 92/00980, in the name of SEPPIC, in combination with fatty alcohol hemisulfosuccinates of formula (III):

(III)

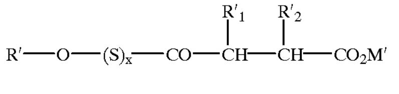

in which:

R' is a linear or branched alkyl radical which has from 6 to 32 carbon atoms, preferably from 8 to 16 carbon atoms and more preferably from 10 to 14 carbon atoms, one of $R'_1$ and $R'_2$ is a group $SO_3M'$, the other is a hydrogen atom, M' is an alkali metal, preferably sodium.

Within the scope of the present invention the alkylpolyglycoside hemisulfosuccinates of above-mentioned formula (I) may comprise a residue of a sugar S chosen from maltose, dextrose, fructose and preferably glucose residues. In general, mixtures of alkylpolyglycoside hemisulfosuccinates of formula (I) will be employed, characterized, on the one hand, by the nature of the alkyl radicals denoted by R and, on the other hand, by the mean value of x. Preferred mixtures of alkylpolyglycoside hemisulfosuccinates of formula (I) are those in which R denotes a linear or branched alkyl radical containing from 8 to 16 carbon atoms, more preferably from 10 to 14 carbon atoms, the mean value of x being between 1.1 and 2. The foaming compositions according to the invention usually include more than 3% by weight, preferably from 5 to 15% by weight, of at least one alkylpolyglycoside hemisulfosuccinate of formula (I).

When it is employed as an ARAFFF emulsifier, the foaming composition according to the invention includes a water-soluble polymer forming a thickening agent. The latter may consist especially of (i) a water-soluble synthetic polymer or copolymer like the copolymer of methyl vinyl ether and of maleic anhydride or (ii) of a heteropolysaccharide, more particularly a heteropolysaccharide chosen from tragacanth gum, carob gum, guar gum, sodium alginate, scleroglucan or, preferably, xanthan gum or (iii) cellulose ethers and esters such as methyl cellulose, carboxymethyl cellulose and hydroxypropyl methyl cellulose.

The concentration of thickening agent in the foaming composition of the invention may be between 0.1 and 10% by weight, preferably between 0.5 and 4% by weight.

A foaming composition according to the invention may further include an inorganic salt such as NaCl or, preferably, $MgCl_2$. The presence of such an inorganic salt is required above all when the foaming composition is intended to be mixed with mains water to form a foam. It has been found, in fact, that, contrary to what happens with sea water, the foam formed by mixing the foaming composition of the invention with mains water does not always form a continuous film at the surface from which it is dispersed. Surprisingly, this disadvantage can be overcome when the foaming composition according to the invention includes such an inorganic salt, in particular $MgCl_2$. The concentration of inorganic salt in the foaming composition according to the invention is generally between 1 and 30% by weight, preferably between 5 and 20% by weight.

With a view to stabilizing the foam formed and to reinforcing the effect produced by the inorganic salt, the foaming composition according to the invention may also include a fatty alcohol $R_3OH$, $R_3$ being a $C_6$–$C_{32}$, preferably $C_8$–$C_{14}$, alkyl radical.

The weight ratio of this fatty alcohol to the alkylpolyglycoside hemisulfosuccinate of formula (I) is generally between 1/20 and 1/4.

The alkylpolyglycoside hemisulfosuccinate may be employed alone or in combination with a hemisulfosuccinate alcohol of formula (III) as mentioned above. Such a combination between an alkylpolyglycoside hemisulfosuccinate of formula (I) and a fatty alcohol hemisulfosuccinate of formula (III) can be prepared according to the method described in PCT International Application FR 92/00980. Advantageously, the compounds of formulae (I) and (III) include substituents R and R' and M and M', which are, respectively, identical. This combination usually includes from 40 to 90%, preferably from 50 to 70% by weight, of at Least one alkylpolyglycoside hemisulfosuccinate of formula (I) and from 10 to 50%, preferably from 10 to 30% by weight of at least one fatty alcohol hemisulfosuccinate of formula (III).

The composition according to the invention may comprise, as surface-active agent which does not contain fluorine, only the alkylpolyglycoside hemisulfosuccinate surfactant of formula (I). However, this composition may also comprise another surfactant which does not contain fluorine. This surfactant which does not contain fluorine may be anionic, amphoteric or nonionic.

As an anionic surfactant not containing fluorine there may be mentioned, for example, those including carboxylate, phosphate, sulfonate and sulfate groups, such as sodium alkyl ether sulfates, alkyl sulfates and alkylbenzene-sulfonates.

As amphoteric surfactant not containing fluorine there may be mentioned, for example, alkylbetaines, alkylamidopropylbetaines, sulfobetaines, amidoetherpropionates and alkyl β-iminopropionates.

As surfactant not containing fluorine and nonionic there may be mentioned, for example, amine oxides, alkylpolyglycosides, ethoxylated alcohols and ethoxylated alkylphenols.

Furthermore, the composition according to the invention may include urea, a glycol or a glycol ether such as diethylene glycol n-butyl ether, propylene glycol n-butyl ether or dipropylene glycol n-butyl ether.

A subject matter of the invention is especially a foaming composition of the ARAFFF type including approximately:

10% by weight of a combination as defined above between a product of formula (I) and a product of formula (III)

4% of amphoteric fluorine-containing surfactants of formula (II)

1% of a water-soluble polymer

10% of a glycol or of a glycol ether

1% of a mixture of fatty alcohols including 85% of $C_{12}$ alcohol and 15% of $C_{14}$ alcohol 10% of urea and sea water q.s.p. 100.

A foaming composition according to the invention can be prepared merely by mixing these components.

From another aspect, the invention relates to the use of a foaming composition as described above as a fire-extinguishing emulsifier. When this foaming composition comprises a water-soluble polymer then it can be employed as a fire-extinguishing emulsifier of the ARAFFF type. When this foaming composition does not comprise such a thickening agent, it can be employed as a fire-extinguishing emulsifier of the AFFF type.

A foaming composition according to the invention can be used for forming a foam by expansion with mains water or by expansion with sea water.

DETAILED DESCRIPTION OF THE INVENTION

The aim of the example below is to illustrate the present invention.

In the example, the parameters taken into account were determined as indicated hereinafter:

1. Foamability of the Foaming Composition 250 ml of sea water are introduced into a 2-1 beaker, to which a foaming composition is added to form a solution containing 5% by weight of the latter; the solution is stirred with a microvortex at 3000 revolutions/minute for 2 min.

The following were determined:

the expansion time (Tf), i.e. the intermediate time of stirring elapsed at the disappearance of the vortex.

the viscosity ($V_0$) of the foam measured by means of a Rheovisco rotating disk viscometer, at 18 revolutions/minute (disk situated 1 cm below the top of the foam.

the height ($H_0$) of foam (in mm) formed after 2 minutes' stirring.

the halt-life time (T½) necessary to separate by draining one half of the initial volume of solution. The foam height (H½) and its viscosity (V½) are also measured at the half-life time 2. Alcohol Fire Test This test consists in applying 200 ml of a foam formed according to the process described in point 1 above, to 100 ml of ethanol which has been on fire for 30 seconds.

The following are then measured:

the time before complete extinction of the fire (Te); when the extinction is immediate, Te=0 s;

the time before complete destruction of the foam once the fire is extinguished (Td).

EXAMPLE

Several foaming compositions of the ARAFFF type were prepared merely by mixing their compounds, including (% by weight of active material):

| | |
|---|---|
| Monopropylene glycol | 10 |
| Rhodopol 23(1) | 1 |
| Sipol $C_{12}$—$C_{14}$(2) | 1 |
| Surfactant(s) | 10 |
| Forafac 1157(3) | 2 |
| Forafac 1157 N(4) | 2 |
| Urea | 10 |
| Sea water | q.s.p. 100 |

(1) Xanthan gum marketed by Rhône-Poulenc, (2) Mixture of fatty alcohols including, by weight, 85% of $C_{12}$ alcohol and 15% of $C_{14}$ alcohol, marketed by Sidobre Sinnova, (3) and (4) amphoteric fluorine-containing surfactants manufactured by Elf Atochem, of general formula:

$$C_nF_{2n+1}CH_2CH_2SO_2NHCH_2CH_2CH_2N^+(CH_3)_2CH_2COO^-$$

The surfactants employed were the following:

Surfactants 1 (comparative): Mixture of variable contents of Amonyl™ 380 BA(5) and of a solution of alkylpolyglycosides (APG) containing 55% of active material; the APS consisting of a mixture 85% by weight of an alkylpolyglucoside with a $C_{10}$ alkyl chain, 7.5% by weight of an alkylpolyglucoside with a $C_{12}$ alkyl chain and 7.5% by weight of an alkylpolyglucoside with a $C_{14}$ alkyl chain.

(5): cocoamidopropyl betaine in aqueous solution containing 30% of active material, marketed by SEPPIC.

Surfactants 2 (comparative): Mixture of variable contents of sodium lauryl ether sulfate, NaLes 2.2 EO, containing 70% of active material and of the solution containing 55% of APG defined insofar as surfactants 1 above are concerned.

Surfactants 3 (according to the invention): a combination between (i) 80% by weight of a mixture of sodium alkylpolyglycoside hemisulfosuccinates of formula (I), where R denotes, respectively, a $C_{10}$ alkyl radical (85% by weight of the mixture), a $C_{12}$ alkyl radical (7.5% by weight of the mixture) and a $C_{14}$ alkyl radical (7.5% by weight of the mixture) and (ii) 20% by weight of a mixture of three sodium fatty alcohol hemisulfosuccinates of formula (III) where R' has the same meaning as R.

Surfactant 4 (according to the invention): a combination between (i) 80% by weight of a 70/25/5 mixture of three sodium alkylpolyglycoside hemisulfosuccinates of formula (I) where R denotes, respectively, $C_{12}$, $C_{14}$ and $C_{16}$ alkyl radicals and (ii) 20% by weight of a 70/25/5 mixture of three sodium fatty alcohol hemisulfosuccinates of formula (III) where R' has the meaning of R indicated above.

The surfactants 3 and 4 are prepared according to the process described in Example 2 of International Application PCT/FR 92/00980.

The characteristics of the various foaming compositions prepared appear in Tables 1 to 3 below:

The results obtained show that a composition according to the invention has a short expansion time, is stable at ambient temperature and allows an alcohol fire to be rapidly extinguished.

Furthermore, a composition according to the invention makes it possible to obtain a foam destruction time after fire extinction which is from 3 to 8 times longer than any of the foaming compositions tested by way of comparison.

TABLE 1

| Test | 1 | 2 | 3 | 4 | 5 |
|---|---|---|---|---|---|
| Surfactants 1: Amonyl ™ 380 BA/ APG solution | 100/0 | 70/30 | 50/50 | 30/70 | 0/100 |
| Appearance of the foaming composition at ambient temperature | fluid gel | fluid gel | fluid gel | fluid gel | fluid gel |
| Foamability at 5% in sea water | | | | | Does not expand in |
| $Tf/H_0/V_0$ | 20"/160/4820 | 18"/170/3340 | 18"/165/3050 | 80"/145/2660 | 2 min. |
| T½/H½/V½ | 34'/130/— | 28'/140/— | 26'/140/2140 | 26'/105/2010 | |
| Alcohol fire test: Te/Td | 0/7' | 0/8' | 0/9' | 0/9'30" | |

TABLE 2

| Test | 6 | 7 | 8 | 9 | 10 |
|---|---|---|---|---|---|
| Surfactants 2: NaLes/APG solution | 100/0 | 70/30 | 50/50 | 30/70 | 0/10 |
| Appearance of the foaming composition at ambient temperature | fluid solution phase separation in 1 d | fluid gel | fluid gel | fluid gel | fluid gel |
| Foamability at 5% in sea water | | | | | Does not expand in |
| $Tf/H_0/V_0$ | | 14"/170/2870 | 16"/165/2860 | 27"/165/3110 | 2 min. |
| T½/H½/V½ | | 21'/140/1770 | 22'/135/1940 | 24'/140/2080 | |
| Alcohol fire test: Te/Td | | 0/9' | 0/8' | 0/7" | |

TABLE 3

| Test | 11 | 12 |
|---|---|---|
| Surfactant 3 | + | − |
| Surfactant 4 | − | + |
| Appearance of the foaming composition at ambient temperature | fluid gel | fluid gel |
| Foamability at 5% in sea water | | |
| $Tf/H_0/V_0$ | 19"/160/3130 | 67"/140/2930 |
| T½/H½/V½ | 26'/135/1940 | 30'/115/2080 |
| Alcohol fire test: Te/Td | 0/30' | 6"/80' |

We claim:

1. Foaming composition comprising at least one fluorine-containing surfactant, at least one fatty alcohol $R_3OH$ where $R_3$ denotes a linear or branched alkyl radical containing from 6 to 32 carbon atoms, and at least one alkyl polyglycoside hemisulfosuccinate surfactant of formula I:

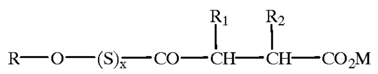

(I)

in which:

R denotes an alkyl radical with a linear or branched chain which has from 6 to 18 carbon atoms, S denotes a sugar residue, one of $R_1$ or of $R_2$ denotes a group $SO_3M$, the other being a hydrogen atom, M denotes an alkali metal, and x denotes an integer of between 1 and 10.

2. Foaming composition according to claim 1, wherein the fluorine-containing surfactant is amphoteric.

3. Foaming composition according to claim 2, wherein the amphoteric fluorine-containing surfactant is a fluorine-containing betaine of formula II:

(II)

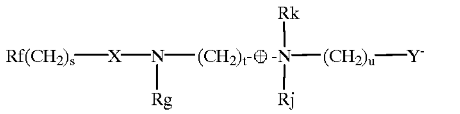

in which:

Rf is a linear or branched perfluoroalkyl radical containing from 4 to 18 carbon atoms, X denotes a CO or $SO_2$ group, Rg denotes a hydrogen atom or a methyl or ethyl radical, each of Rk and Rj, which are identical or different, denotes a methyl or ethyl radical, Y denotes an $SO_3^-$, $OSO_3^-$ or $COO^-$ group, s is an integer ranging from 0 to 6, t is an integer ranging from 1 to 5, and u is an integer ranging from 1 to 5.

4. Foaming composition according to claim 1, wherein said composition includes from 1 to 8% by weight of the fluorine-containing surfactant.

5. Foaming composition according to claim 1, wherein said composition includes a mixture of alkylpolyglycoside hemisulfosuccinates of formula (I) in which R denotes an alkyl radical which has from 8 to 16 carbon atoms, and the mean value of x is between 1.1 and 2.

6. Foaming composition according to claim 1, wherein in the formula (I) S is the residue of a glucose.

7. Foaming composition according to claim 1, wherein said composition includes more than 3% by weight of an alkylpolyglycoside hemisulfosuccinate of formula (I).

8. Foaming composition according to claim 1, wherein said composition additionally includes a water-soluble polymer in a proportion of between 0.1 and 10% by weight.

9. Foaming composition according to claim 8, wherein the water-soluble polymer is a heteropolysaccharide.

10. Foaming composition according to claim 1, wherein said composition includes an inorganic salt in a proportion of between 1 and 30% by weight.

11. Foaming composition according to claim 10, wherein the inorganic salt is $MgCl_2$.

12. Foaming composition according to claim 1, wherein the weight ratio of the fatty alcohol to the alkylpolyglycoside hemisulfosuccinate of formula (I) is between 1/20 and 1/4.

13. Foaming composition according to claim 1, wherein an alkylpolyglycoside hemisulfosuccinate of formula (I) is used in combination with a fatty alcohol hemisulfosuccinate of formula (III):

(III)

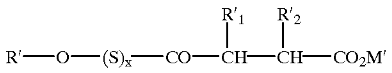

in which:

R' is a linear or branched alkyl radical which has from 6 to 32 carbon atoms, one of $R'_1$ and of $R'_2$ denotes a group $SO_3M'$, the other is a hydrogen atom, and M' is an alkali metal wherein S and x are as stated in claim 1.

14. Foaming composition according to claim 13, wherein R and R' and M and M' are identical.

15. Foaming composition according to claim 14, wherein said composition includes a combination between:

(i) 80% by weight of a mixture of:

85% by weight of sodium alkylpolyglycoside hemisulfosuccinate of formula (I) in which R denotes a $C_{10}$ alkyl radical;

7.5% by weight of sodium alkylpolyglycoside hemisulfosuccinate of formula (I) in which R denotes a $C_{12}$ alkyl radical; and 7.5% by weight of sodium alkylpolyglycoside hemisulfosuccinate of formula (I) in which R denotes a $C_{14}$ alkyl radical, and:

(ii) 20% by weight of a corresponding mixture of sodium fatty alcohol hemisulfosuccinates of formula (III).

16. Foaming composition according to claim 14, wherein said foaming composition includes a combination between:

(i) 80% by weight of a mixture of:

70% by weight of sodium alkylpolyglycoside hemisulfosuccinate of formula (I) in which R denotes a $C_{12}$ alkyl radical, 25% by weight of sodium alkylpolyglycoside hemisulfosuccinate of formula (I) in which R denotes a $C_{14}$ alkyl radical, and 5% by weight of sodium alkylpolyglycoside hemisulfosuccinate of formula (I) in which R denotes a $C_{16}$ alkyl radical and:

(ii) 20% by weight of a mixture of:

70% of sodium fatty alcohol hemisulfosuccinate of formula (III) in which R' denotes a $C_{12}$ alkyl radical;

25% of sodium fatty alcohol hemisulfosuccinate of formula (III) in which R' denotes a $C_{14}$ alkyl radical; and 5% of sodium fatty alcohol hemisulfosuccinate of formula (III) in which R' denotes a $C_{16}$ alkyl radical.

17. Foaming composition of the ARAFFF type including approximately by weight:

10% of a combination as defined in claim 13;

4% of amphoteric fluorine-containing surfactants of formula (II)

(II)

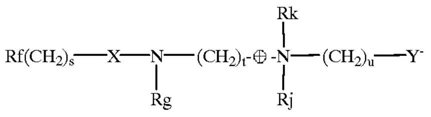

in which:

Rf is a linear or branched perfluoroalkyl radical containing from 4 to 18 carbon atoms, X denotes a CO or $SO_2$ group, Rg denotes a hydrogen atom or a methyl or ethyl radical, each of Rk and Rj, which are identical or different, denotes a methyl or ethyl radical, $Y^-$ denotes an $SO_3^-$, $OSO_3^-$ or $COO^-$ group, s is an integer ranging from 0 to 6, t is an integer ranging from 1 to 5, u is an integer ranging from 1 to 5, 1% of a water-soluble heteropolysaccharide, 10% of a glycol or of a glycol ether, 1% of a mixture of fatty alcohols including 85% of $C_{12}$ alcohol and 15% of $C_{14}$ alcohol, 10% of urea, and sea water q.s.p. 100.

18. Foaming composition according to claim 1, wherein said composition additionally includes a glycol or a glycol ether and/or urea.

19. Foaming composition according to claim 1, wherein said composition additionally includes at least one anionic, amphoteric or nonionic surfactant not containing fluorine.

20. Method of extinguishing a fire which comprises: applying to the fire the foaming composition of claim 1.

21. Method of extinguishing a fire which comprises: applying to the fire a foaming composition according to claim 8, as a fire-extinguishing emulsifier of the ARAFFF type.

* * * * *